No. 882,641. PATENTED MAR. 24, 1908.
C. T. JOSLIN.
INVALID BED.
APPLICATION FILED JULY 5, 1907.
5 SHEETS—SHEET 1.
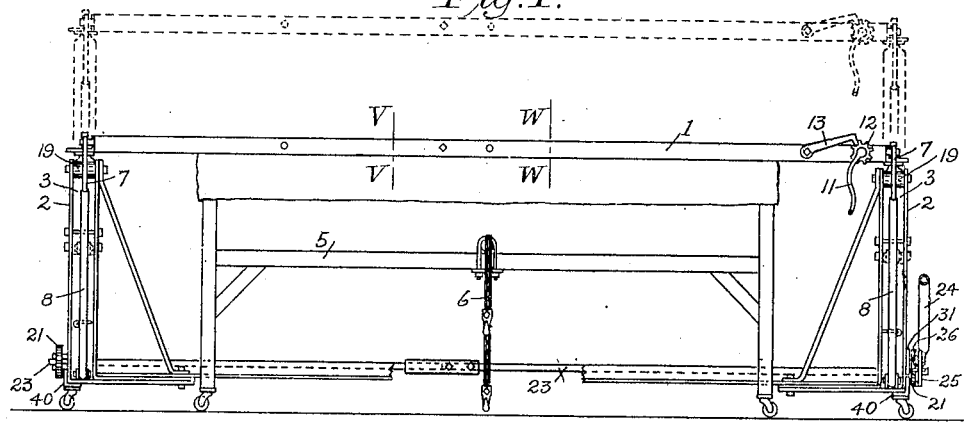
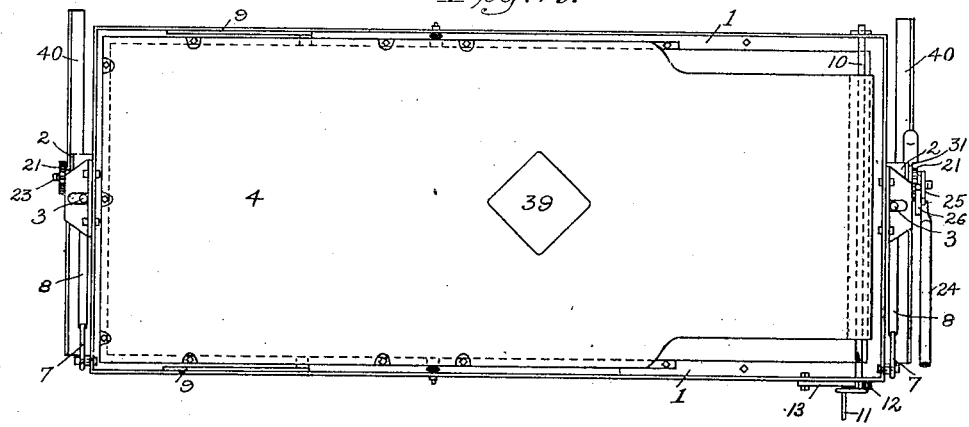
Witnesses:
John W. Fisher.
Inventor.
Charles T. Joslin
By Walter E. Ward,
Attorney.

No. 882,641.

PATENTED MAR. 24, 1908.

C. T. JOSLIN.
INVALID BED.
APPLICATION FILED JULY 5, 1907.

5 SHEETS—SHEET 2.

Witnesses:
John W. Fisher.

Inventor.
Charles T. Joslin
By Walter E. Ward.
Attorney.

No. 882,641. PATENTED MAR. 24, 1908.
C. T. JOSLIN.
INVALID BED.
APPLICATION FILED JULY 5, 1907.

5 SHEETS—SHEET 3.

No. 882,641.

PATENTED MAR. 24, 1908.

C. T. JOSLIN.
INVALID BED.
APPLICATION FILED JULY 5, 1907.

5 SHEETS—SHEET 4.

Witnesses:
John W. Fisher

Inventor:
Charles T. Joslin
By Walter E. Ward,
Attorney.

No. 882,641. PATENTED MAR. 24, 1908.
C. T. JOSLIN.
INVALID BED.
APPLICATION FILED JULY 5, 1907.
5 SHEETS—SHEET 5.
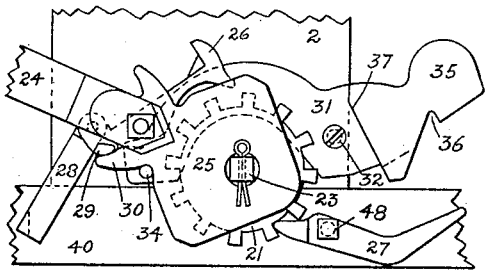
Fig. 18.
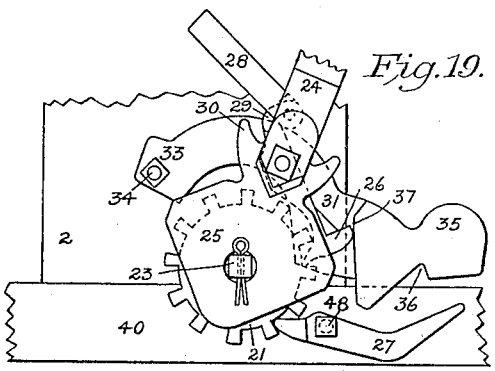
Fig. 19.
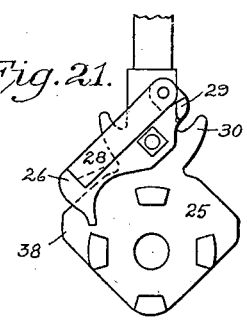
Fig. 21.
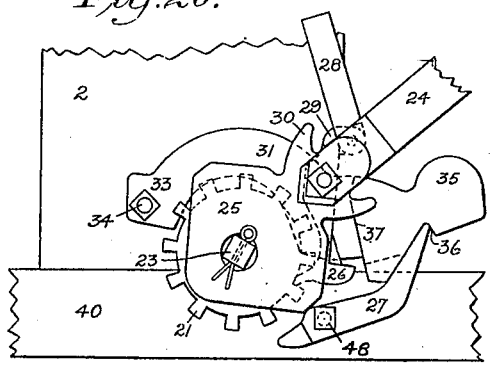
Fig. 20.
Fig. 22. Fig. 25. Fig. 26.
Fig. 23. Fig. 24.
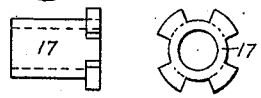
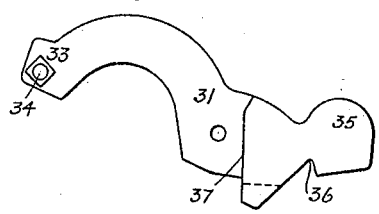
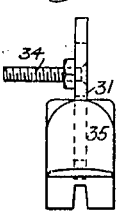
Fig. 27. Fig. 28.
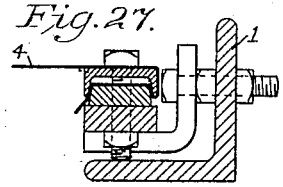
Witnesses:
John W. Fisher
Inventor,
Charles T. Joslin
By Walter E. Ward,
Attorney.

UNITED STATES PATENT OFFICE.

CHARLES T. JOSLIN, OF JERUSALEM, NEW YORK.

INVALID-BED.

No. 882,641.  Specification of Letters Patent.  Patented March 24, 1908.

Application filed July 5, 1907. Serial No. 382,180.

*To all whom it may concern:*

Be it known that I, CHARLES T. JOSLIN, a citizen of the United States, residing at Jerusalem, town of New Scotland, in the county of Albany and State of New York, have invented certain new and useful Improvements in Invalid-Beds, of which the following is a specification.

My invention relates to beds for invalids, and the objects of my invention are to construct a bed which is strong, easily operated, cheap, and sanitary, and which may be raised and lowered horizontally, or either end may be raised or lowered without disturbing the other end, or either side tilted sidewise, all of which movements will be smooth and steady and can be made without disturbing the patient occupying the bed; and also to so construct the bed that it may be formed into a reclining chair with the back at any desired angle, while the seat portion will remain horizontal, and a suitable space provided for the feet of the invalid, and a smooth portion remain in front for use as a table or stand.
The operator being able to cause the bed to assume any of these positions without touching the patient occupying the bed.

Figure 5:
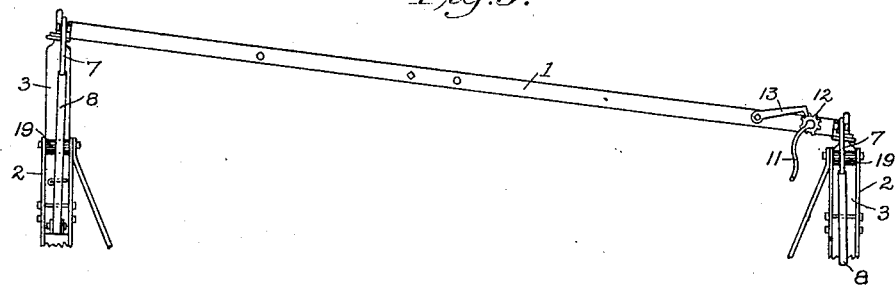
Figure 6:
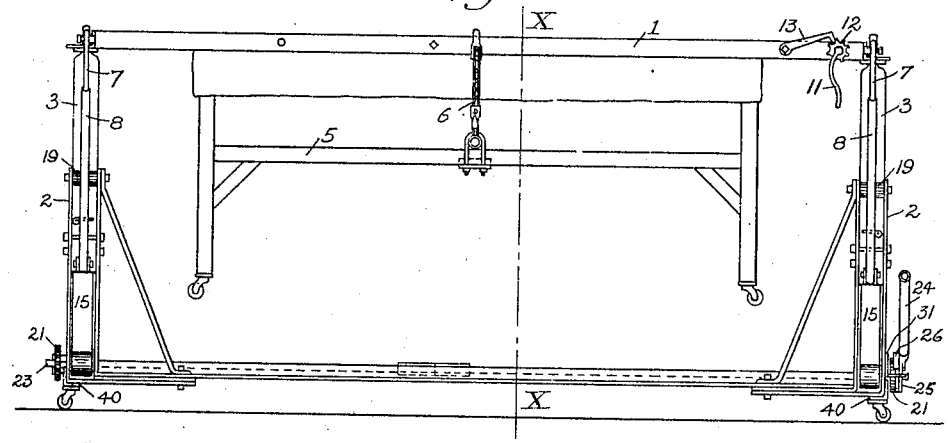
Figure 7:
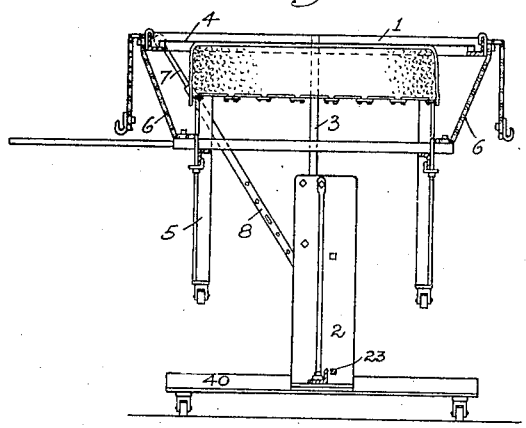
Figure 8:
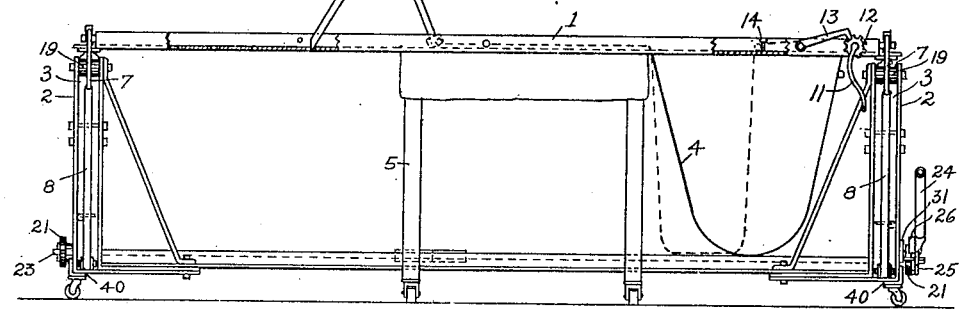
Figure 9:
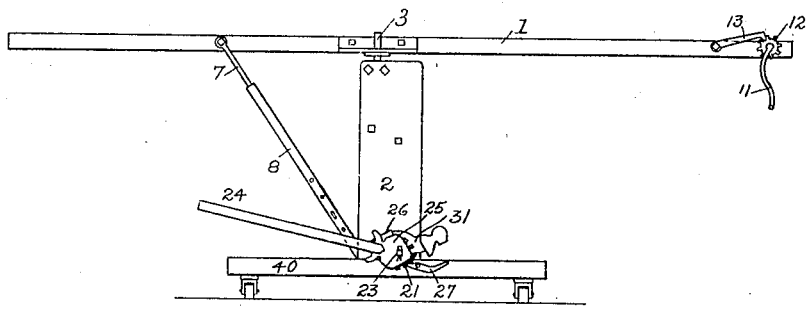
Figure 10:
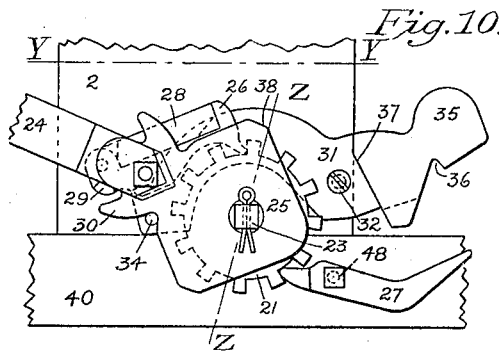
Figure 11:
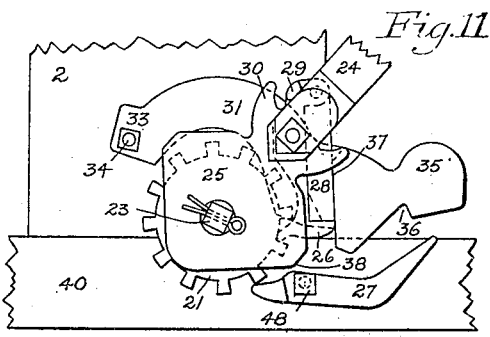
Figure 12:
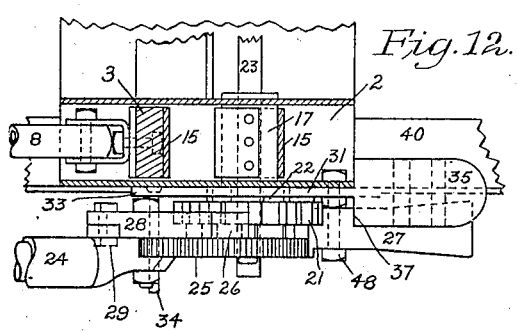
Figures 13, 14:
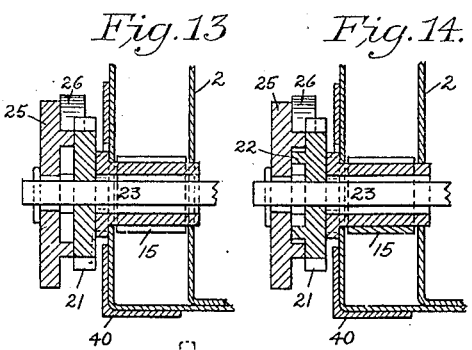
Figure 15:
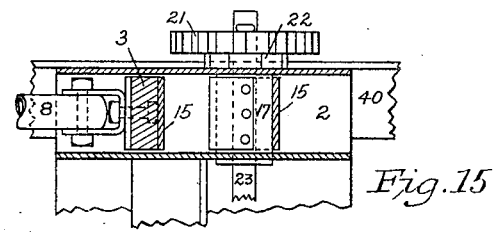
Figure 16:
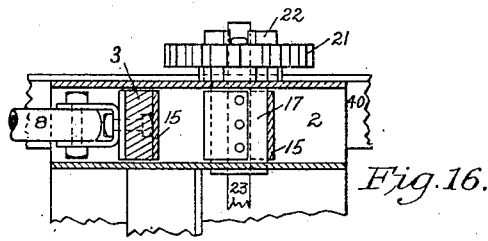
Figure 17:
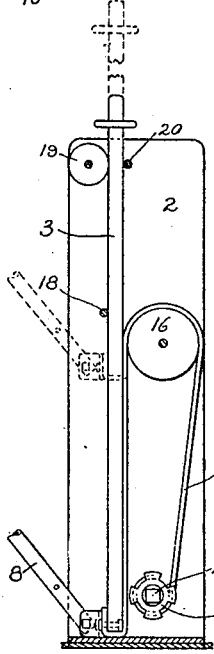

Other objects of my invention will be disclosed as I proceed with my specification.
I accomplish these objects by means of the mechanism illustrated in the accompanying drawings, in which:

Figure 1 is a side view of my invalid bed showing the supporting cot underneath.
Fig. 2 is a top plan view of the same. Fig. 3 is a view of the end having the raising and lowering device attached. Fig. 4 is an end view of the opposite end with dotted lines showing the bed tilted. Fig. 5 is partly a side view showing one end raised. Fig. 6 is a side view showing the bed raised and supporting the cot attached to the frame of the bed and raised with it. Fig. 7 is a cross section on line X—X Fig. 6. Fig. 8 is a side view showing the bed formed into a chair. Fig. 9 is a side view showing the raising and lowering device attached at the sides of the bed instead of at the ends. Figs. 10 and 11 are front views of the raising and lowering device showing in detail the parts in position raising the bed. Fig. 12 is a horizontal section on line Y—Y on Fig. 10. Fig. 13 is a section on lines Z—Z Fig. 10. Fig. 14 is a section on line Z—Z Fig. 10, except that the ratchet wheel is reversed, so that one end of the bed will be raised without the other. Fig. 15 is a horizontal section of the standard on the opposite end of the bed, showing the ratchet wheel locked. Fig. 16 is the same section with the ratchet wheel reversed. Fig. 17 is a detail view of the standard at the head of the bed with the raising and lowering device and the front plate removed. Figs. 18, 19 and 20 are detail views of the raising and lowering device in position lowering the bed. Figs. 21, 22, 23, 24, 25, and 26 are detail views of various parts in the raising and lowering device. Fig. 27 is a section on line V—V on Fig. 1. Fig. 28 is a section on line W—W on Fig. 1.

Similar numerals refer to similar parts throughout the several views.

1 is the frame of the bed, usually made of angle iron, of any desired length and width. The frame is held by two standards, 2, 2, located at the ends of the bed, as shown in Fig. 1, or at the sides of the bed, as shown in Fig. 9. In either case operating in the same manner, as will be more fully described. The standard, 2, is attached to the bed plates, 40, which rests upon the floor or upon casters. The frame of the bed is attached to posts, 3, which are a part of the standards, 2, 2. The posts, 3, are designed to slide upward in the standards, 2, so as to raise and lower the frame of the bed. 4 is a canvas or cloth covering to the bed. This canvas is attached to the frame at the sides and ends by folding it around iron plates or bars and bolting them together, as shown in Figs. 27 and 28. The canvas attached in this way may be stretched to any desired tension.

Under the frame is the cot, 5, which is not attached in any way to the rest of the frame, except as hereinafter described. The cot is arranged with ordinary springs and a mattress, and designed to be of such a height as that the canvas covering, 4, will rest upon the mattress on the cot, so that the person lying upon the canvas, 4, will have the full benefit of the springs and mattress of the cot. The cot may be attached to the frame of the bed by any desired means, as by the chain, 6, which is permanently attached to the side of the cot. The frame over the chain, 6, is provided with a suitable means for fastening the chain to the frame at the side, so that when the bed is raised the cot will be raised with it, as shown in Figs. 6 and 7, and the person lying on it will continue to have the advantages of the springs and mattress of the cot.

Attached to two corners of the frame of the bed are the rods, 7, 7, and attached to the posts of the corresponding standards, near the bottom are the sleeves, 8, 8, designed to receive the rods, 7, 7. The sleeves, 8, 8, are provided with holes, and the rods, 7, 7 with a corresponding hole, as shown in Figs. 3 and 4, so that the bed can be tilted to one side, and the rods, 7, secured to any desired position in the sleeves, 8, 8, so as to hold the bed firmly in the tilted position.

The iron bars to which the canvas is attached, and which rest in the frame of the bed, are provided with hinges at a suitable distance from the head of the bed, so that the portion of the canvas forming the bed may be raised to any desired angle and held there by braces, 9, 9, as shown in Fig. 8. The canvas immediately in front of the hinge is permanently secured to the frame of the bed for a short distance, long enough to form a seat for a person to rest upon.

The canvas used is much longer than enough to cover the top of the frame, and at the foot of the bed it is rolled up upon a roller, 10, which is provided with a crank, 11, and ratchet wheel, 12, and a dog, 13, so that it may be rolled up as tight as desired and held in position by the dog, and from the foot of the bed back to where the canvas is permanently attached to the frame the canvas is loose, so that by raising up the dog, 13, it may be unrolled and let down, forming a place for the feet of the person occupying the bed, as shown in Fig. 8 when the bed is used as a chair, and when in this position the cot may be turned endwise so that the person sitting up in the bed in an inclined position may still have the benefit of the springs and mattress of the cot, or the bed may be raised up and the cot rest sidewise under the bed, as described, for obvious purposes. The canvas may be provided with a loop a short distance from the end of the foot of the bed, through which any suitable rod may be inserted, and the ends held by a bolt at a point a short distance from the foot of the bed, as at 14, Fig. 8, still leaving sufficient space for the feet and knees of the invalid sitting up in the bed, and then the canvas drawn tight by the roller, 10, so as to leave a smooth space in the form of a table in front of the patient sitting up in the bed.

The bed is raised and lowered by the novel device, as follows. The frame of the bed is supported upon the posts, 3, as already stated. The posts, 3, are slidably mounted in the standards, 2. 15, 15, are straps, preferably made of leather or metal, one end of each being attached to the foot of the post, 3, the strap then passes over the wheel or loose pulley, 16 (see Fig. 17) and the other end of the strap is attached to drum, 17. Said pulley and drum being mounted within the standard, so that by winding the strap, 15, on the drum, 17, will cause the posts, 3 to slide upward. The weight of the bed on the post will cause it to descend. The posts are kept in perpendicular position ascending or descending by the pulley, 16, the bolt, 18, the loose sheave, 19, and the bolt, 20, all located in the standards. Both standards are alike in these respects. The drums, 17, are turned by the ratchet wheels, 21. The ratchet wheels, 21, are provided with lugs, 22, upon one side which fit into corresponding recesses in the sides of the drums, 17. A rod or shaft, 23, extends from the ratchet wheel, 21, at one end of the bed to the corresponding ratchet wheel 21 at the other end of the bed. This shaft is preferably made in sections, so that one section will be of proper length for use when the standards, 2, are used on the sides of the bed. The shaft, 23, is preferably square or angular and adapted to fit in the square center holes in the ratchet wheels, 21, so that by turning the ratchet, 21, at one end of the bed also turns the corresponding ratchet wheel at the other end of the bed. The ratchet wheel is operated by the handle, 24, attached to the cam, 25. Attached to the cam, 25, is the dog, 26, adapted to engage the teeth of the ratchet wheel, so as to turn the ratchet wheel as the handle is moved forward. The dog, 27, is pivoted to the standard, 2, by the bolt or screw, 48, in such position that the head of the dog, 27, will engage the teeth of the ratchet wheel and prevent the wheel from turning backward. When the dog 27 is at rest the weight of the body of the dog holds the head of the dog against the teeth of the wheel, as shown in Fig. 10. When the handle, 24, is moved forward the dog, 26, will engage the teeth of the ratchet wheel and turn the wheel forward and the dog, 27, will hold the wheel from turning back when the handle is moved backward, releasing the dog 26. The turning of the ratchet, as above described, will likewise turn the ratchet wheel on the other end or side of the bed, by means of the shaft, 23, as already described. The ratchet wheels at the same time, when in their normal position, turn the drums, 17, by means of the lugs or projections, 22, upon the ratchet wheels operating in the corresponding recesses in the drums, 17, and the drums turning will wind up the straps, 15, thus elevating the posts, 3, and the bed supported thereon.

If it is desired to elevate one end of the bed and not the other end, the ratchet wheel on the end not to be elevated is removed and reversed and put back again the same as before, except the side with lugs faces outward instead of engaging the recesses of the drum, so that turning the ratchet wheel at that end will not turn the corresponding drum, but the ratchet wheel at the other end will turn its drum in the usual way, thus elevating that end of the bed without disturbing the other end.

To lower the bed in a steady uniform manner I reverse the operation of raising it, as follows: I construct the dog, 26, of two pieces, hinged together as shown in Figs. 18, 19, 20 and 21. A portion of the back of the dog, designated as 28, is hinged to the main body of the dog, at the end of the dog beyond the point where it is pivoted to the cam, 25. So that when the part, 28, is folded over backward the weight back of the pivot of the dog, 26, will overbalance the other part and hold the head of the dog above and out of contact with the teeth of the ratchet wheel, so that the handle, 24, may be moved forward without disturbing the ratchet wheel. The dog, 26, also has a shoulder, 29, at the end where the folding over part 28 is hinged to it, extending laterally slightly beyond the sides of the dog. The hinged portion, 28, when folded backward rests against this shoulder or lug, 29, and is held by it nearly in a line with the main body of the dog, and also this lug, 29, when the hinged portion, 28, is folded back, rests against the lug, 30, of the cam, so as to keep the dog from dropping too far away and to hold it in position ready for further use. The bracket, 31, is pivoted to the plate of the standard by the bolt, 32, behind and slightly above the ratchet wheel and above the end of the shaft, 23. The body of the bracket, 31, is somewhat in the form of a semi-circle, as shown in Fig. 25, and is adapted to extend partly around the lugs on the ratchet wheel, so that the end 33 will extend beyond the ratchet wheel as shown in Figs. 19 and 20.

34 is a bolt or shoulder extending out from the bracket as shown in Fig. 26. When the bolt, 34, is free from the lug, 30, on the cam, 25, the heavier end, 35, of the bracket will rest upon the bed plate, 40, as shown in Figs. 11 and 19. This head has a notch, 36, and forms the shoulder, 37, where it unites with the rest of the bracket, which is much thinner, as shown in Figs. 25 and 26.

When it is desired to lower the bed the hinged part, 28, of the dog, 26, is folded backward and the dog released from contact with the teeth of the ratchet wheel. The handle is then moved forward until the head of the dog, 26, comes in contact with the shoulder, 37. The bracket, 31, is so located that upon the further movement of the handle the shoulder, 37, will force the head of the dog, 26, into contact with the ratchet teeth and will move the ratchet wheel forward enough to loosen the grip of the dog, 27, and the corner, 38, of the cam, 25, will press upon the head of the dog, 27, so as to so turn the dog, 27, upon its pivot that the rail end of the dog will enter notch, 36, of the bracket, 31, then by reversing the movement of the handle the ratchet wheel will turn backward. The weight of the bed upon the supporting post, 3, will exert sufficient power for that purpose and dog, 26, being held in contact with the teeth in the ratchet wheel will prevent the wheel turning any faster than the movement of the handle. The movement of the handle backward is continued until the lug, 30, of the cam strikes the shoulder or bolt, 34, extending out from the end of the bracket, 31, and as the movement then continues the pressure upon the shoulder, 34, moves that end of the bracket downward and turning upon the pivot, 32, raises the head of the bracket and thus releases the tail of the dog, 27, which turning upon its pivot its head engages once more the teeth of the ratchet wheel and holds it while the head of the dog, 26, is released from the teeth, and the movement repeated until the bed is lowered as far as desired.

The canvas covering of the bed is provided with a hole, 39, for obvious purposes. This hole, 39, is preferably located in that portion of the canvas covering which is fixedly attached to the frame and used for a seat when the bed is in the form of a chair. The bed containing the invalid may be raised sufficiently from the cot to rest any vessels desired on the cot under the hole. If desired a piece of canvas may be attached by hooks and eyes, or otherwise, over the hole making a smooth surface. The canvas cover being attached by means of iron bars and bolts to the frame is readily removed for washing or for replacing with new cloth.

The entire bed may be constructed wholly of cloth and metal and so be perfectly sanitary.

Constructed in this manner my bed is economical to manufacture strong and durable, easily to operate, and presents the greatest advantages and comforts to the invalid occupying it. The invalid can be cared for and arranged in the numerous positions described without being touched by the hands of attendant and all done easily, smoothly and steadily without disturbing the patient.

What I claim as my invention and desire to secure by Letters Patent is:

1. An invalid bed consisting of a frame; a cloth covering said frame; the upper portion of said cloth covering adjoining the head of the bed attached to iron bars hinged to said frame; means whereby the said iron bars may be sustained in a reclining or in a perpendicular position; the central portion of said cloth covering being fixedly attached to the sides of said frame, and the lower portion of said cloth covering adjoining the foot of the bed being unattached to the sides of the frame and adjustably attached to the foot of the bed, whereby the same may be relaxed, thereby affording space for the feet and legs of a person sitting on the central portion of said cloth covering and using the upper portion thereof for a pack, the whole being adapted to thus assume the form of a chair, substantially as described.

2. An invalid bed, consisting of a frame; a cloth covering on said frame; one portion of said cloth covering attached to bar irons hinged upon said frame; braces attached to said bar irons, whereby the same may be sustained in a reclining or perpendicular position, in the form of a chair; the central portion of said cloth covering being fixedly attached to the frame of said bed, and the lower portion of said cloth covering being attached to a roller at the foot of the bed and adapted to be rolled thereon; a roller at the foot of said bed with bearings in the sides of the frame; a crank attached thereto, whereby said roller may be turned; a ratchet wheel attached to said crank; a dog attached to said frame adapted to engage said ratchet wheel; whereby the loose portion of said covering may be wound tightly upon said roller and held by said dog or may be unrolled, forming a space for the feet of the person occupying the said bed when made in the form of a chair, substantially as described.

3. An invalid bed consisting of a frame covered with cloth; two upright posts slidably mounted in standards and adapted to support said frame thereon; two pulleys, one mounted in each of said standards near the top thereof; two drums, one mounted in each of said standards near the bottom thereof; straps extending from the foot of said posts over said pulleys and attached to said drums; recesses in one side of each of said drums; two ratchet wheels, each provided with lugs on one side thereof adapted to engage the recesses in said drums; openings in the center of said ratchet wheels; a shaft connecting said ratchet wheels and fitting in the said openings therein and adapted to turn said ratchet wheels; said ratchet wheels adapted to be mounted upon said shaft with the lugs engaging the recesses in the drums or in the reverse position, whereby the lugs would not engage the said recesses in said drums; means for operating said shaft thereby raising and lowering both ends of said bed simultaneously or either end separately.

4. An invalid bed consisting of a frame covered with cloth; two upright posts slidably mounted in standards and adapted to support said frame thereon; two pulleys, one mounted in each of said standards near the top thereof; two drums, one mounted in each of said standards near the bottom thereof; recesses in the sides of said drums; ratchet wheels provided with lugs on the sides adapted to engage the recesses in said drums; angular openings in the center of said ratchet wheels; an iron bar connecting said ratchet wheels and fitting said angular openings, whereby the turning of one ratchet wheel will turn the other; a cam idly mounted upon one end of said bar; a handle attached to said cam; a dog attached to said cam, adapted to engage said ratchet wheel and move the same forward; another dog attached to said standard and adapted to engage said ratchet wheel and prevent the same turning backward, whereby said ratchet wheel may be turned forward, thereby winding said straps upon said drums and raising the bed and holding it in the position desired.

5. An invalid bed consisting of a frame covered with cloth; two upright posts slidably mounted in standards and adapted to support said frame thereon; two pulleys, one mounted in each of said standards near the top thereof; two drums, one mounted in each of said standards near the bottom thereof; recesses in the sides of said drums; ratchet wheels provided with lugs on the sides adapted to engage the recesses in said drums; angular openings in the center of said ratchet wheels; an iron bar connecting said ratchet wheels and fitting said angular openings, whereby the turning of one ratchet wheel will turn the other; a cam idly mounted upon one end of said bar; a handle attached to said cam; a dog attached to said cam, adapted to engage said ratchet wheel and move the same forward; another dog attached to said standard and adapted to engage said ratchet wheel and prevent the same from turning backward; a weight hinged on the back of said first mentioned dog and beyond the pivot attaching the same to said cam, whereby the folding over of said weight will counterbalance the weight of the head and raise it from contact with the teeth of said ratchet wheel; a bracket pivotally attached to said standard having one end enlarged and counterbalancing the rest of said bracket, and containing a shoulder and a notch in the thick end and a lug on the thin end, whereby upon the movement of said handle and cam backward said shoulder will cause the head of said dog to engage said ratchet teeth and the corner of said cam will press the head of the second dog, above mentioned, out of contact with said ratchet wheel, and the tail of said dog in the notch of said bracket, whereby the reverse motion of said handle will cause the ratchet wheel to reverse its movement until said cam strikes the lug upon the thin part of said bracket and releases the second dog, whereby the suspended bed may be lowered.

6. An invalid bed consisting of a frame; a cloth covering said frame; said frame resting pivotally upon posts; rods attached to the frame of said bed; sleeves attached to the bottom of said posts adapted to hold said rods slidably therein; means for holding said rods in the desired position in said sleeves, whereby said bed may be tilted in either direction and held stationary in any desired position, substantially as described.

In testimony whereof I have affixed my signature in presence of two witnesses.

CHARLES T. JOSLIN.

Witnesses:
LOTTIE PRIOR,
DUDLEY B. WADE.